United States Patent
Bernal et al.

(10) Patent No.: US 11,071,920 B2
(45) Date of Patent: Jul. 27, 2021

(54) MODULAR MULTI-SYSTEM GAMING CONSOLE

(71) Applicant: PUSH-RUN HOLDINGS, LLC, Los Angeles, CA (US)

(72) Inventors: Bryan Alan Bernal, Los Angeles, CA (US); Eric Christensen, McKinney, TX (US); Robert Wyatt, Boulder, CO (US)

(73) Assignee: PUSH-RUN HOLDINGS, LLC, Los Angeles, CA (US)

( * ) Notice: Subject to any disclaimer, the term of this patent is extended or adjusted under 35 U.S.C. 154(b) by 0 days.

(21) Appl. No.: 16/317,449

(22) PCT Filed: Jul. 12, 2017

(86) PCT No.: PCT/US2017/041788
§ 371 (c)(1),
(2) Date: Jan. 11, 2019

(87) PCT Pub. No.: WO2018/013735
PCT Pub. Date: Jan. 18, 2018

(65) Prior Publication Data
US 2019/0299110 A1  Oct. 3, 2019

Related U.S. Application Data

(60) Provisional application No. 62/361,977, filed on Jul. 13, 2016.

(51) Int. Cl.
*A63F 13/98* (2014.01)
*A63F 13/69* (2014.01)
(Continued)

(52) U.S. Cl.
CPC .............. *A63F 13/95* (2014.09); *A63F 13/30* (2014.09); *A63F 13/90* (2014.09); *A63F 13/98* (2014.09);
(Continued)

(58) Field of Classification Search
None
See application file for complete search history.

(56) References Cited

U.S. PATENT DOCUMENTS 8,706,944 B2   4/2014 Song
2002/0156952 A1  10/2002 Shono
(Continued)

FOREIGN PATENT DOCUMENTS

CN   101038557 A   9/2007
TW       552780 B   9/2003
(Continued)

OTHER PUBLICATIONS

Anonymous. (Jun. 4, 2016). "About the Retrode," Retrode.org, XP055672906, Retrieved from the Internet: URL: https://web.archive.org/web/20160604130217/http://www.retrode.com, retrieved on Mar. 30, 2020, two pages.
(Continued)

*Primary Examiner* — Lawrence S Galka
(74) *Attorney, Agent, or Firm* — Morrison & Foerster LLP

(57) ABSTRACT

A modular multi-system gaming console can be configurable for use in conjunction with expansion consoles (also referred to as expansion modules, expansion units, and/or element modules herein) as a gaming console emulator and/or for use as an audio/video converter (e.g., an up-converter), data recorder, or streaming device. Further, the modular multi-system gaming console can evoke the original gaming experience of a game played on original hardware. A modular multi-system gaming console can provide a consistent platform for display, content management, statistical storage and analysis (e.g., high scores, fastest speed runs, etc.), and live streaming and other services (including core services described herein) across a multitude of gaming console platforms. A modular multi-system gaming console can also
(Continued)

provide a more authentic game experience via active cartridge reading. Further, by providing a flexible and configurable architecture for the modular multi-system gaming console, support for new consoles can be added to the modular multi-system gaming console without requiring users to purchase an entirely new console that repeats hardware for providing the core services.

13 Claims, 9 Drawing Sheets

(51) Int. Cl.
- *A63F 13/95* (2014.01)
- *A63F 13/30* (2014.01)
- *G07F 17/32* (2006.01)
- *A63F 13/90* (2014.01)

(52) U.S. Cl.
CPC ...... *G07F 17/3202* (2013.01); *G07F 17/3223* (2013.01)

(56) References Cited

U.S. PATENT DOCUMENTS

| | | |
|---|---|---|
| 2004/0010739 A1* | 1/2004 | Odom .............. G01R 31/31907 714/724 |
| 2004/0268042 A1 | 12/2004 | Okada et al. |
| 2005/0261062 A1 | 11/2005 | Lewin et al. |
| 2006/0251407 A1 | 11/2006 | Thordarson et al. |
| 2006/0281556 A1 | 12/2006 | Solomon et al. |
| 2007/0129151 A1 | 6/2007 | Crowder et al. |
| 2007/0207843 A1 | 9/2007 | Hwang |
| 2009/0271173 A1 | 10/2009 | Vnukov |
| 2010/0048306 A1 | 2/2010 | Weiland |
| 2012/0040762 A1 | 2/2012 | Shinjo et al. |
| 2014/0274380 A1 | 9/2014 | Kazama |
| 2014/0378224 A1* | 12/2014 | Beckett .................. A63F 13/95 463/31 |

FOREIGN PATENT DOCUMENTS

| | | |
|---|---|---|
| TW | 200945204 A | 11/2009 |
| TW | I505095 B | 10/2015 |

OTHER PUBLICATIONS

Anonymous. (Mar. 31, 2016). "Plug-in Adapters," Retrode, XP055672836, Retrieved from the Internet: URL: https://web.archive.org/web/20160331035451/https://www.retrode.com/plug-in-adapters, retrieved on Mar. 2, 2020, two pages.

Anonymous. (May 1, 2013). "World's Smallest Multi-Cartridge Console," Retrode.org, XP055672907, Retrieved from the Internet: URL:https://www.retrode.org/2013/04/worlds, on Mar. 2, 2020, two pages.

European Search Report dated Mar. 17, 2020, for EP Application No. 17828419.6, twelve pages.

ROC (Taiwan) Search Report dated Jan. 29, 2019, for Patent Application No. 107100988, with English translation, four pages.

ROC (Taiwan) Office Action dated Mar. 4, 2021, for TW Patent Application No. 109135179, with English translation, 25 pages.

\* cited by examiner

Emulator Selection Sequence 900

MODULAR MULTI-SYSTEM GAMING CONSOLE

CROSS REFERENCE TO RELATED APPLICATIONS

This application is a National Phase Patent Application under 35 U.S.C. § 371 of International Application No. PCT/US2017/41788, filed Jul. 12, 2017, and claims benefit of the U.S. Provisional Patent Application No. 62/361,977, filed Jul. 13, 2016, which are hereby incorporated by reference in their entireties.

FIELD OF DISCLOSURE

This relates generally to gaming emulator consoles, and more particularly to a modular gaming emulator console with interchangeable expansion console units to play a variety of original console games.

BACKGROUND OF THE DISCLOSURE

As computing technology has advanced, video game console manufacturers have phased out older video game consoles—for example, the Nintendo Entertainment System (NES)—in favor of newer, more sophisticated gaming consoles—for example, the Nintendo Switch. However, the popularity of the older gaming consoles continues to endure—in many cases, long past the original lifespans of those consoles and their corresponding game media. As older gaming consoles continue to be replaced by newer ones, gamers may find it impractical or impossible to enjoy games on the older gaming consoles—for example, due to hardware failure, commercial unavailability, or lack of manufacturer support. Gamers thus demand tools for enjoying classic games using modern, commercially available computer hardware and displays. At the same time, many gamers value solutions that can capture the authentic experience, warts and all, of playing these classic games on their original hardware. One option that has become popular is the use of software-based gaming console "emulators"—software that runs on modern computer hardware, but that simulates the behavior of original video game console hardware, and can execute code designed to be executed on that original hardware. Some emulators involve reading game code and data from a computer file that contains data previously copied from a read-only memory ("ROM") (e.g., on a game cartridge or an optical disc). This behavior may differ from the original hardware, which typically would read game code and data directly from the ROM itself, rather than from a computer file. Because the behavior of many classic games is highly idiosyncratic and specific to the original gaming hardware, such emulators may therefore fail to fully capture the authentic experience of playing those games. Another option, "hardware cloning," involves duplicating aspects of the original hardware of the consoles. While hardware clones may more faithfully represent the original gaming hardware than can software emulators, they are frequently incompatible with modern display devices without the use of an undesirable video conversion process. There is thus a need for technology that can present an authentic classic gaming experience on modern computing hardware and displays without the drawbacks of either hardware cloning, or purely software-based emulation.

SUMMARY OF THE DISCLOSURE

A modular multi-system gaming console can be configurable for use in conjunction with expansion consoles (also referred to as expansion modules, expansion units, and/or element modules herein) as a gaming console emulator and/or for use as an audio/video converter (e.g., an up-converter), data recorder, or streaming device. Further, the modular multi-system gaming console can evoke the original gaming experience of a game played on original hardware. A modular multi-system gaming console can provide a consistent platform for display, content management, statistical storage and analysis (e.g., high scores, fastest speed runs, etc.), and live streaming and other services (including core services described herein) across a multitude of gaming console platforms. A modular multi-system gaming console can also provide a more authentic game experience via active cartridge reading. Further, by providing a flexible and configurable architecture for the modular multi-system emulator console, support for new consoles can be added to the modular multi-system emulator console without requiring users to purchase an entirely new console that repeats hardware for providing the core services.

DETAILED DESCRIPTION

Figure 1:
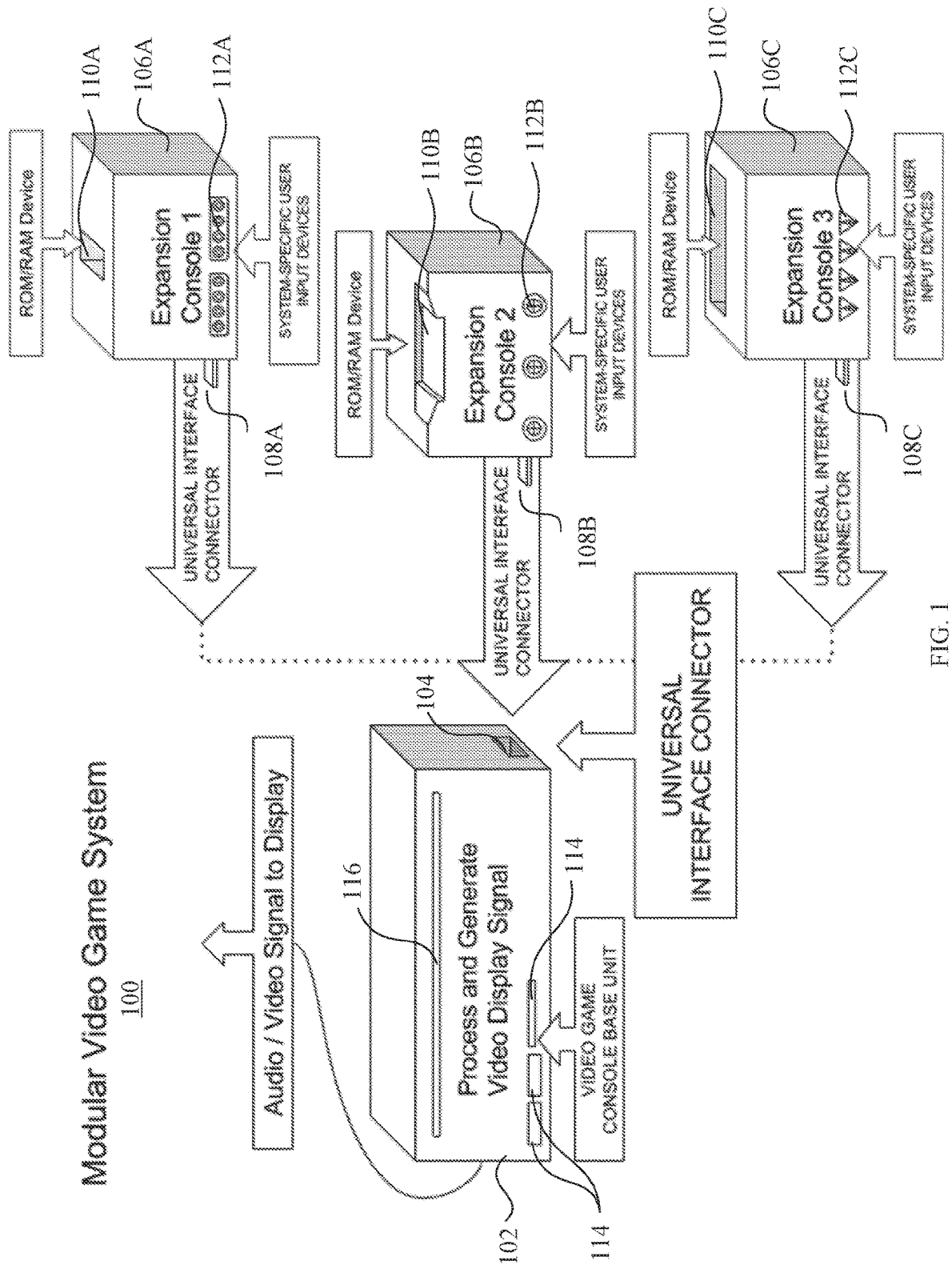
FIG. 1 illustrates an exemplary modular video game system architecture according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

As computing technology has advanced, video game console manufacturers have phased out older video game consoles—for example, the Nintendo Entertainment System (NES)—in favor of newer, more sophisticated gaming consoles—for example, the Nintendo Switch. However, the popularity of the older gaming consoles continues to endure—in many cases, long past the original lifespans of those consoles and their corresponding game media. As older gaming consoles continue to be replaced by newer ones, gamers may find it impractical or impossible to enjoy games on the older gaming consoles—for example, due to hardware failure, commercial unavailability, or lack of manufacturer support. Gamers thus demand tools for enjoying classic games using modern, commercially available computer hardware and displays. At the same time, many gamers value solutions that can capture the authentic experience, warts and all, of playing these classic games on their original hardware. One option that has become popular is the use of software-based gaming console "emulators"—software that runs on modern programmable computer hardware, but that simulates the behavior of original video game console hardware, and can execute code designed to be executed on that original hardware. Some emulators involve copying data contained in a read-only memory ("ROM") (e.g., on a game cartridge or an optical disc) to a computer file, which provides game data and code to the emulator. However, because the behavior of many classic games is highly idiosyncratic and specific to the original gaming hardware, such emulators may fail to fully capture the authentic experience of playing those games. Another option, "hardware cloning," involves duplicating aspects of the original hardware of the consoles. While hardware clones may more faithfully represent the original gaming hardware than can software emulators, they are frequently incompatible with modern display devices without the use of an undesirable video conversion process. There is thus a need for technology that can present an authentic classic gaming experience on modern computing hardware and displays without the drawbacks of either hardware cloning, or purely software-based emulation.

A modular multi-system gaming console can be configurable for use in conjunction with expansion consoles (also referred to as expansion modules, expansion units, and/or element modules herein) as a gaming console emulator and/or for use as an audio/video converter (e.g., an upconverter), data recorder, or streaming device. Further, the modular multi-system gaming console can evoke the original gaming experience of a game played on original hardware. A modular multi-system gaming console can provide a consistent platform for display, content management, statistical storage and analysis (e.g., high scores, fastest speed runs, etc.), and live streaming and other services (including core services described herein) across a multitude of gaming console platforms. A modular multi-system gaming console can also provide a more authentic game experience via active cartridge reading. Further, by providing a flexible and configurable architecture for the modular multi-system gaming console, support for new consoles can be added to the modular multi-system gaming console without requiring users to purchase an entirely new console that repeats hardware for providing the core services.

As used herein, the term "emulation" refers to a process of a first hardware (e.g., computing hardware including a first CPU type) executing (or simulating the execution of) software instructions that were designed to be executed on a second hardware (e.g., computing hardware including a second CPU type). The second hardware may be referred to herein as a "target." For example, a modern processor (e.g., an Intel Core i7 processor) that executes (or simulates the execution of) software designed for a "legacy" processor (e.g., a Zilog Z80 processor) may be referred to as emulating the legacy processor. Similarly, the modern processor, or a device that includes the modern processor, may be referred to as emulating a device that includes the legacy processor. Similarly, the modern processor, or a device that includes the modern processor, may be referred to as emulating software designed to run on the legacy processor. As used herein, an "emulator" is a combination of hardware and/or software that performs emulation.

As used herein, the term "cartridge" refers to hardware comprising a ROM that includes code (e.g., instructions that can be executed by a processor) and/or data (e.g., graphical data or audio data). A cartridge may comprise one or more connectors (e.g., pins) for interfacing the ROM to an external device (e.g., a computer including a processor). A cartridge may comprise additional hardware components, such as one or more of a clock, a battery, a storage (e.g., a magnetic storage), a memory, a memory controller, and a processor.

Modular Video Game System Architecture

FIG. 1 illustrates an example modular video game system 100 (i.e., a modular multi-system gaming console) according to examples of the disclosure. In some examples, the modular video game system can include a video game console base unit 102 that can act as a master unit for the modular video game system architecture. The base unit 102 can include a universal interface connector 104 for connecting to various expansion consoles 106A-106C (described in more detail below). In some examples, as discussed in more detail below, the base unit 102 can be configured to receive data from the expansion consoles 106A-106C via the connector 104, process the data, and output an audio/video signal to a display and/or audio system. The base unit 102 can be connected to an expansion console 106A-106C through a bus (e.g., example configurable expansion bus 214 as discussed further below). In some examples, the base unit 102 can further include additional connectors 114 for connecting to storage, external devices, input/output devices (e.g., video game controllers), and further expansion blocks. In some examples, the additional connectors 114 can include USB 3.0 connectors, SD/MMC card slots, and other connection interfaces. In some examples, the base unit 102 can further include an optical disc drive 116, which can be a universal CD-ROM drive, and can optionally include support for formats such as CD-ROM, DVD, and Blu-ray. In some examples, the base unit 102 can further include connectors for wired internet connections (not shown) and hardware for Wi-Fi networking capabilities. In some examples, all or part of base unit 102 may be implemented as a SOC (system on a chip) or SOM (system on a module) which may include a CPU, GPU, memory, bus controller, input/output connections, or other components. In some examples, the base unit 102 can have platform software (e.g., firmware) which may include a graphical user interface (GUI) and may perform low-level operations on one or more hardware components.

The base unit 102 can be coupled by the base unit's universal interface connector 104 to any of various expansion consoles 106A-106C by respective universal interface connectors 108A-108C of the expansion consoles. In some examples, physical connections can be formed by universal interface connectors 104 and 108A-C, and communications between the base unit 102 and a connected expansion console (e.g., one of 106A-106C) can be performed over a bus that physically connects over the universal interface connectors. In some examples, as described in more detail below, the base unit 102 can configure one or more connections of the bus. For example, base unit 102 can individually configure respective connections of the bus to be inputs, outputs, bi-directional lines, interrupts, or flags, or to perform custom functions. In some examples, the base unit 102 may configure the connections of the bus as one or more groups, for instance, one or more configurable banks each comprising one or more connections of the bus.

In some examples, each of expansion consoles 106A-106C can be associated with a target gaming console. Target gaming consoles may include gaming consoles, such as the Nintendo Entertainment System (NES), Super NES (SNES), SEGA Genesis, and NEC TurboGrafx16, that were designed to execute game code stored on cartridge-based media. Target gaming consoles may also include gaming consoles, such as the Sega Saturn and Sony PlayStation, that were designed to execute game code stored on optical media (e.g., CD-ROM or DVD-ROM), or on other forms of computer-readable media. In some examples, the expansion consoles 106A-106C can be associated with multiple target gaming consoles. For instance, an example expansion console can be associated with two or more variants (e.g., regional variants) of a target gaming console, such as the Nintendo Famicom and Nintendo Entertainment System, the Sega Mega Drive and Sega Genesis, and the NEC PC Engine and NEC TurboGrafx 16. In some examples, an example expansion console can be associated with multiple target gaming consoles from a single manufacturer (e.g., Nintendo NES and SNES). In some examples, expansion consoles 106A-106C can be associated with multiple gaming consoles from different manufacturers.

In some examples, one or more of expansion consoles 106A-106C can include one or more connectors, such as cartridge slots 110A-110C. Cartridge slots 110A-110C may couple an expansion console, associated with a target gaming console, to a cartridge compatible with that target gaming console. The expansion console may communicate game code and/or game data to and from a cartridge via the cartridge slot. In some examples, instead of or in addition to a cartridge slot (e.g., 110A-110C), the expansion console can include an interface to one or more other forms of computer-readable media, such as flash memory (e.g., SD, MMC, etc.), optical discs (e.g., CD-ROM, DVD, Blu-ray), or any other suitable format. In some examples, an optical disc drive 116 or appropriate connector 114 of the base unit 102 can be used for reading game media.

In some examples, expansion consoles 106A-106C can have one or more input device connectors 112A-112C for connecting to console-specific user input devices (e.g., video game controllers) for the gaming console associated with the expansion console. In some examples, each of the different expansion consoles 106A-106C can have console-specific user input devices (e.g. video game controllers) without a cartridge connector or media (e.g., CD-ROM, SD Card) readers, specifically to interact with software loaded by an optical disc drive 116 included on the base unit 102.

In some examples, the base unit 102 can be configured to run software for emulating a target gaming console associated with one or more of expansion consoles 106A-106C. In some examples, a connected expansion console (e.g., one of 106A-106C) can perform emulation of the target gaming console, and the base unit 102 can act as a video/audio conversion and output device. In some examples, base unit 102 and a connected expansion console (e.g., one of 106A-106C) can work in tandem to perform emulation and audio/video output tasks, such that efficiencies are realized by having the base unit 102 perform certain tasks while the expansion console performs other tasks. Moreover, a bus connecting base unit 102 to an expansion console can allow flexibility for different console configurations, as well as different allocations of game emulation between the base unit 102 and the expansion console (e.g., one of 106A-106C). In some examples, as described below, a bus can be configured based on, for example, a particular console configuration; a particular expansion unit; or a particular target game or target game console to be emulated.

In some examples, modular video game system 200 may comprise a handheld device. In such examples, modular video game system 200 may include an integrated display; an integrated speaker; an integrated input controller (e.g., controller 216 in FIG. 2); and/or an internal power supply (e.g., a battery). In some examples, base unit 102, bus 214, and/or a connected expansion console (e.g., one or expansion consoles 106A-106C) may be configured for handheld operation. As one example, in examples in which modular video game system 200 includes a battery without an external power source, base unit 102, bus 214, and/or a connected expansion console may be configured to consume less power than in non-handheld operation, in order to maximize battery life. As another example, in examples in which modular video game system 200 includes an integrated display, base unit 102 and/or a connected expansion console may be configured to output video in accordance with the characteristics (e.g., screen resolution) of that display. As another example, because a handheld device can be expected to be used in different locations, base unit 102 may include or connect to a GPS unit of modular video game system 200 to determine the location of the system. Software running on modular video game system 200, such as OS 208, may then use data from the GPS unit to add location sensitivity to various software features (e.g., leaderboards, social networking). As another example, because a handheld device may frequently be used in close proximity (e.g., less than ten meters) to other handheld devices, base unit 102 may be configured to create or join an ad hoc network with other nearby devices (e.g., via Wi-Fi hardware as described above), which network could be used by base unit 102 and/or a connected expansion console to send and receive data (e.g., game data) with nearby devices. In some examples in which modular video game system 200 comprises a handheld device, the handheld device may connect to base unit 102 and/or a connected expansion console: for example, to enable remote operation of base unit 102 and/or the connected expansion console; to enable continuous play between the handheld device and base unit 102 and/or the connected expansion console (e.g., a user begins play using a display and/or input device connected to base unit 102, and continues play using the handheld device); to enable use of a second display (e.g., a display integrated into the handheld device) in addition to a display connected to base unit 102, for instance to augment the first display with secondary content (e.g., strategy guides. in-game maps, tips, heads-up display); or to perform network-based multiplayer operation of games originally designed to be connected to other players via a physical cable.

Figure 2:
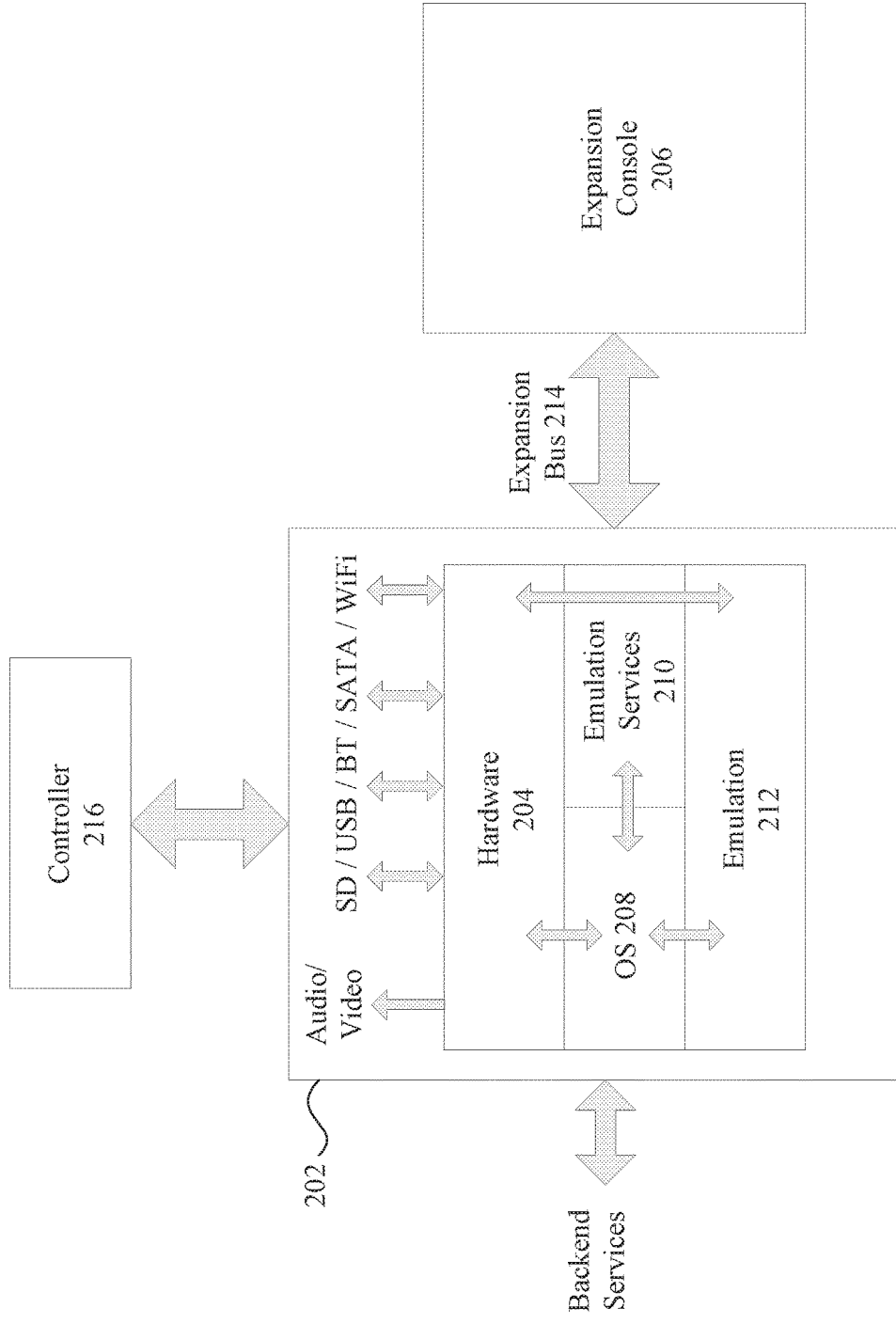
FIG. 2 illustrates an exemplary block diagram of a modular video game system according to examples of the disclosure.

FIG. 2 illustrates an exemplary block diagram of a modular video game system 200 including a base unit 202 (which can correspond to base unit 102 above) architecture connected to an expansion console 206 (which can correspond to expansion consoles 106A-106C above) over the bus 214. As will be described in more detail below, expansion console 206 can be configured in many different ways and provide a variety of different types of output data to the base unit. The base unit 202 can be configured to send and receive data (e.g., game data, controller data, audio and video data, save game data, force feedback data) from expansion console 206. The base unit 202 can also be configurable to support a variety of different communication protocols over the expansion bus 214. With the described configurability of the base unit 202 and expansion bus 214, design of expansion consoles 206 can be highly varied, while providing a consistent user experience. As will be described in more detail below, the expansion console 206 can communicate game data, controller data, and/or audio/video data (among other types of data) over the bus 214.

The base unit 202 can include hardware 204. In some examples, hardware 204 can be used to provide input/output capability for the modular video game system. For example, base unit 202 may present audio and video information (e.g., HDMI audio/video output) to a display, such as a television or a computer monitor (not shown). The base unit hardware 204 can support various input/output protocols, such as SD, USB, Bluetooth, SATA, and Wi-Fi, over one or more I/O channels. In some examples, hardware 204 can include a CPU, GPU, audio processing hardware, GPS, Radio, camera interface, live video streaming encoder, and other hardware components. Hardware 204 can comprise a SOC (system on a chip) or SOM (system on a module) featuring one or more hardware components as described above.

An operating system (OS) 208 running on hardware 204 (e.g., on a CPU of hardware 204) can perform various functions in support of modular video game system 100. For example, OS 208 can perform typical operating system functions, such as resource management, access control, and I/O handling. In some examples, OS 208 can serve as a user-facing front end to modular video game system 100, for example to allow a user to direct, manage, and/or customize the operation of modular video game system 100. In some examples, OS 208 may perform functions such as video encoding and gameplay recording and playback. In some examples, OS 208 can provide an interface to the user (e.g., an interactive graphical user interface), for instance when the modular video game console is not actively presenting game information. In some examples, hardware 204 can include a dedicated processing unit (e.g., one processor of a multiprocessor system or one core of a multicore processor) for performing OS functions of the base unit 202. In some examples, OS 208 can run software for displaying a GUI (graphical user interface). In some examples, OS 208 can run software designed to replace or augment a function of OS 208, such as performing low level functions on hardware 204. In some examples, OS 208 can be responsible for launching a game on modular video game system 100.

Once a game is launched, OS 208 can delegate control of the game to emulation unit 212 of base unit 202. Emulation unit 212 can be used to emulate functionality of a target game console so that a user can play a game designed for that target game console. Emulation unit 212 may comprise software (e.g., software running on hardware 204), processing hardware, or some combination of software and hardware, for running software designed for the target game console. In some examples, OS 208 and emulation unit 212 can be isolated from one another with respect to base unit 202 (e.g., OS 208 and emulation unit 212 may be allocated non-overlapping portions of memory) and operate relatively independently. In some examples, OS 208 and emulation unit 212 may overlap and share data and resources, and have shared functionality.

The emulation unit 212 can work with base unit 202 and expansion console 206 to simulate the user experience of playing a game on the game console for which it was originally designed. For example, emulation unit 212 can receive game data over the bus 214 from an expansion console 206 (e.g., game data on a memory connected to expansion console 206, such as a game cartridge inserted into the expansion console 206). Emulation unit 212 can execute software using one or more configurations of processors. For example, emulation unit 212 may execute software using a single or multiple processors (e.g., one or more processors of a multiprocessor system of hardware 204 and/or one or more cores of a multicore processor of hardware 204), or on a particular combination of CPU and GPU hardware. The configuration of processors (e.g., the number and type of processors utilized) may be determined on a per-game or per-target game console basis, for example in order to provide a gameplay experience similar to that of a particular game or target console. For example, the configuration of processors can be determined based upon the resource requirements and performance characteristics of a target game console. For instance, for a target game console which uses only a single CPU of limited capability and experiences specific performance characteristics as a result, a processor configuration of emulation unit 212 may be determined such that emulation unit 212 simulates those characteristics.

In some examples, emulation unit 212 can be configured to use one or more CPUs, but zero GPUs. This configuration may be selected, for instance, when running games where latency associated with GPU rendering may result in the gameplay experience differing significantly from gameplay on the original console (e.g., by introducing input latency that was not characteristic of gameplay on the original console). In some examples, emulation unit 212 can use one or more CPUs in conjunction with one or more GPU(s), particularly where the game emulation is more computationally intensive (e.g., incorporating 3D graphics) and where CPUs alone may lack sufficient computational power.

In some examples, emulation unit 212 can select an emulator or emulator configuration, from a set of two or more emulators or emulator configurations, to use with a particular target game or target gaming console. An emulator or emulator configuration may be selected because it is particularly well-suited to emulate the target game or target gaming console. For example, an emulator configuration may use a particular combination of resources to meet the needs of a specific target game or game console; or may include specialized functionality specific to a target game or game console. In some examples, an emulator or emulator configuration may be associated with a processor configuration, as described above. For example, an emulator configuration may use a particular configuration of CPUs and/or GPUs associated with a target game console. In some examples, an emulator or emulator configuration may be associated with a power consumption configuration. For instance, a particular emulator configuration may limit computational resources in order to limit power consumption in power-sensitive contexts, such as where modular video game console 200 is a handheld console powered by a battery.

In some examples, the base unit 202 can provide a number of backend services, including a store, leaderboards, achievement tracking, and updating (e.g. operational data, OS updates), cloud storage of game data, user profile data and friends list, data used by recommendation engine, second screen connectivity with mobile devices, and analytics tracking data. In some examples, the backend services can be controlled by OS 208. In some examples, the backend services can include updating functionality that can be used to update the modular video game system 200. For example, the updating functionality can provide new emulators, support for new expansion console configurations (e.g., new communication protocols for bus 214 and different data content), and other new console functionality. This allows for modular video game system 200 to be expanded indefinitely and to continually acquire new functionality.

In some examples, one or more input controllers 216 can connect to the base unit 202 over one or more I/O channels (e.g., USB, Bluetooth, Wi-Fi, etc.). In some examples, input controllers 216 may be original input controllers designed for use with a target gaming console. In some examples, input controllers 216 may be specifically designed for use with a gaming console comprising an emulator, such as modular video game system 200. In some examples, OS 208 can accept user input comprising controller signals received from the expansion console 206 (e.g., via bus 214), and/or from input controller 216 (e.g., via one or more I/O channels described above).

In some examples, emulation services 210 (e.g., software running on hardware 204) can support one or more functions or components of modular video game system 200. For instance, in some examples, emulation services 210 can facilitate communication between emulation unit 212, hardware 204, and OS 208. In some examples, emulation services 210 may synchronize input/output data, such as controller data from expansion console 206 and/or input controller 216. In some examples, emulation services 210 can facilitate the transfer of data between an expansion console 216 and emulation unit 212. In some examples, emulation services 210 may be managed by OS 208. In some examples, emulation services 210 can provide an interface between OS 208 and a game being emulated (e.g., by emulation unit 212), such that OS 208 can input or output data to and from the game, or control or otherwise interact the emulation of the game. For instance, emulation services 210 could "expose" to OS 208 a multiplayer aspect of the game, with which OS 208 could send or receive data using networking hardware connected to base unit 102. Emulation services 210 could also expose to OS 208 game data in memory local to emulation unit 212, which OS 208 could use to perform analytical functions (e.g., tracking high scores or game achievements) as described above.

Expansion Console Configuration Options

Figure 3:
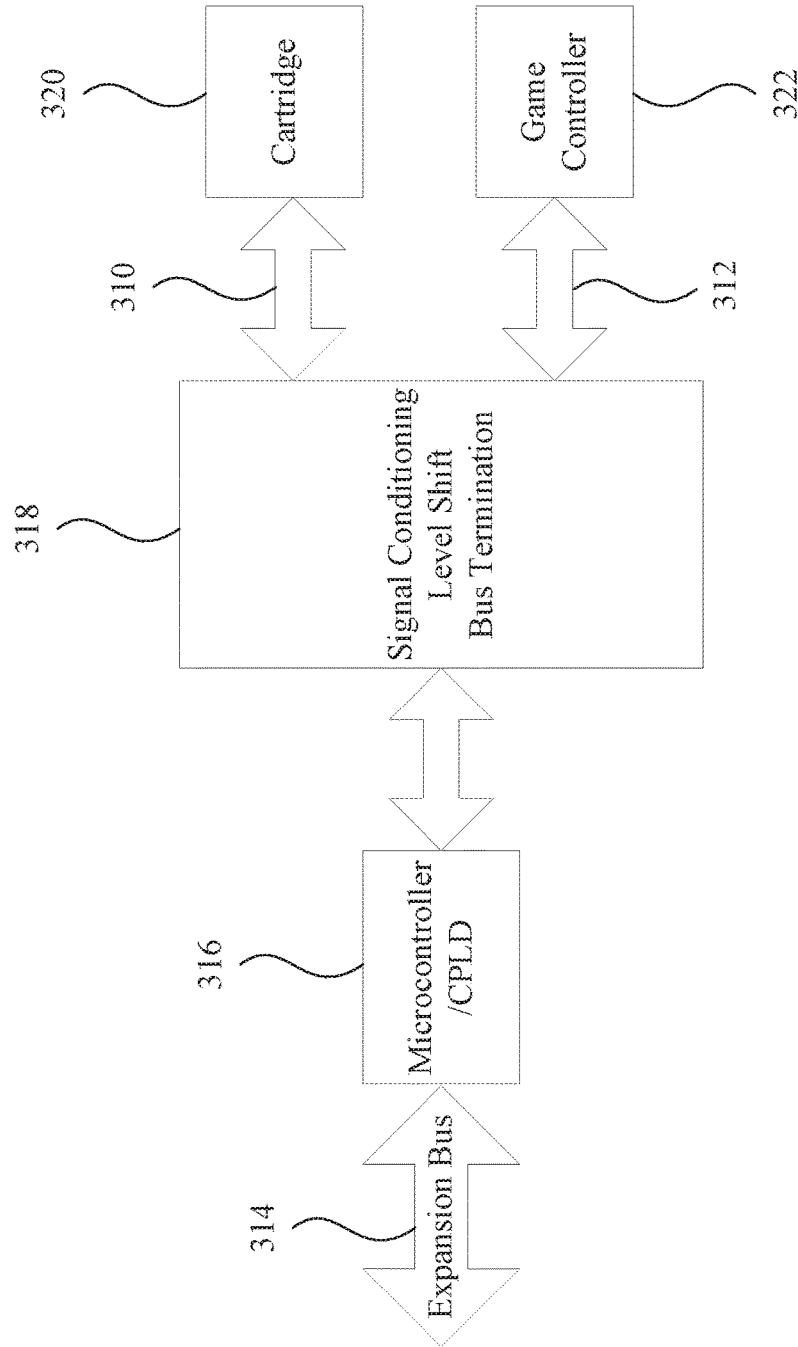
FIG. 3 illustrates a first exemplary expansion console configuration according to examples of the disclosure.

FIG. 3 illustrates an exemplary block diagram of an example expansion console 300 (which can correspond to one of expansion consoles 106A-106C) according to examples of the disclosure. In examples such as shown in FIG. 3, the expansion console 300 can provide game data from game cartridge 320 and/or input data from game controller 322 to the base unit 102 via bus 314. In this configuration, the base unit 102 can be responsible for emulation of the game data, and providing audio and video output signals. In some examples, expansion console 300 comprises microcontroller 316, and the bus 314 (which can correspond to the bus 214 above) can be coupled to microcontroller 316. (As used herein, "microcontroller" can refer to a microcontroller or to any other suitable device, such as a complex programmable logic device (CPLD) or an application-specific integrated circuit (ASIC).) In some examples, a game cartridge 320 can be coupled to the expansion console 300 at cartridge slot 310 (which can correspond to at least one of cartridge slots 110A-110C above). The microcontroller 316 can be configured to communicate with the game cartridge 320, for example by providing address requests for data reads from the game cartridge 320, and by reading the data returned from the game cartridge 320. In some examples, the game cartridge 320 may have relatively slow operating hardware relative to a modern microcontroller, for instance microcontroller 316, and may thus exhibit timing issues. In such examples, the microcontroller 316 can be configured to address such timing issues, for example by presenting wait states and buffering. By including microcontroller 316 as part of the expansion console 300 rather than the base unit 102, the base unit 102 is freed from having to allocate resources to read from game cartridge 320.

In some examples, a controller interface 312 (which can correspond to controller ports 112A-112C above) can be provided on the expansion console 300. Controller interface 312 can act as an interface between microcontroller 316 and game controller 322. In some examples, game controller 322 may be original controller hardware for a target gaming console associated with the expansion console 300. In some examples, game controller 322 may be a special input device designed for use with an emulator system. Some examples may include signal conditioning block 318, which may be disposed for instance between the cartridge 320 and the microcontroller 316, or between the game controller 322 and the microcontroller 316. Signal conditioning block 318 may comprise signal conditioning hardware and/or software for exchanging compatible signals to and from game cartridge 320, game controller 322, and/or microcontroller 316. For example, in some instances, game cartridge 320 and/or game controller 322 may input and output logic levels that are incompatible with microcontroller 316, or may not adhere to communication protocols required by microcontroller 316. In some examples, the signal conditioning block 318 can include level shifting, bus termination, and other suitable signal conditioning that can allow the microcontroller 316 to communicate safely with game cartridge 320 and/or game controller 322.

Figure 4:
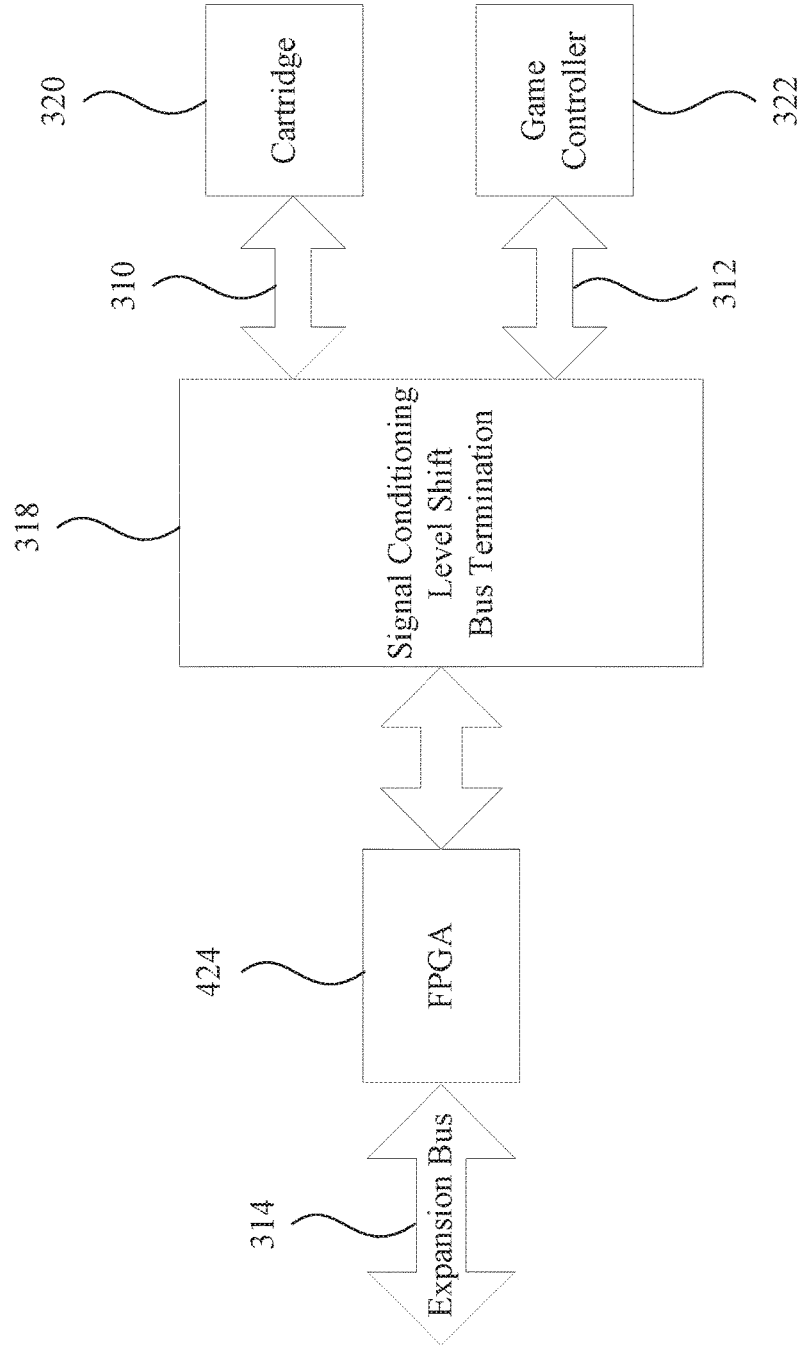
FIG. 4 illustrates a second exemplary expansion console configuration according to examples of the disclosure.

FIG. 4 illustrates an exemplary block diagram of an example expansion console 400 (which can correspond to one of expansion consoles 106A-106C) configuration according to examples of the disclosure. In examples such as shown in FIG. 4, the expansion console 400 can provide game data from game cartridge 320 and/or input data from game controller 322 to the base unit 102 via bus 314. In this configuration, the base unit 102 can be responsible for emulation of the game data, and providing audio and video output signals. In some examples, expansion console 300 comprises a field programmable gate array (FPGA) 424, and the bus 314 (which can correspond to the bus 214 above) can be coupled to FPGA 424. (While an FPGA is used here as an example, other suitable technologies may be used.) In some examples, a game cartridge 320 can be coupled to the expansion console 300 at cartridge slot 310 (which can correspond to at least one of cartridge slots 110A-110C above). The FPGA 424 can be configured to communicate with the game cartridge 320, for example by providing address requests for data reads from the game cartridge 320, and by reading the data returned from the game cartridge 320, and may perform full or partial gaming console emulation. In some examples, the example expansion console 400 can provide video frames and audio data over the bus 314 to the base unit 102, rather than providing game data and controller data. In some examples, the game cartridge 320 may have relatively slow operating hardware relative to modern computing hardware, for instance FPGA 424, and may thus exhibit timing issues. In such examples, the FPGA 424 can be configured to address such timing issues, for example by presenting wait states and buffering. By including FPGA 424 as part of the expansion console 300 rather than the base unit 102, the base unit 102 is freed from having to allocate resources to read from game cartridge 320.

In some examples, a controller interface 312 (which can correspond to controller ports 112A-112C above) can be provided on the expansion console 400. Controller interface 312 can act as an interface between FPGA 424 and game controller 322. In some examples, game controller 322 may be original controller hardware for a target gaming console associated with the expansion console 400. In some examples, game controller 322 may be a special input device designed for use with an emulator system. Some examples may include signal conditioning block 318, which may be disposed for instance between the cartridge 320 and the FPGA 424, or between the game controller 322 and the FPGA 424. Signal conditioning block 318 may comprise signal conditioning hardware and/or software to promote the compatibility and exchange of signals to and from game cartridge 320, game controller 322, and/or FPGA 424. For example, in some instances, game cartridge 320 and/or game controller 322 may input and output logic levels that are incompatible with FPGA 424, or may not adhere to communication protocols required by FPGA 424. In some examples, the signal conditioning block 318 can include level shifting, bus termination, and other suitable signal conditioning that can allow the FPGA 424 to communicate safely with game cartridge 320 and/or game controller 322.

Figure 5:
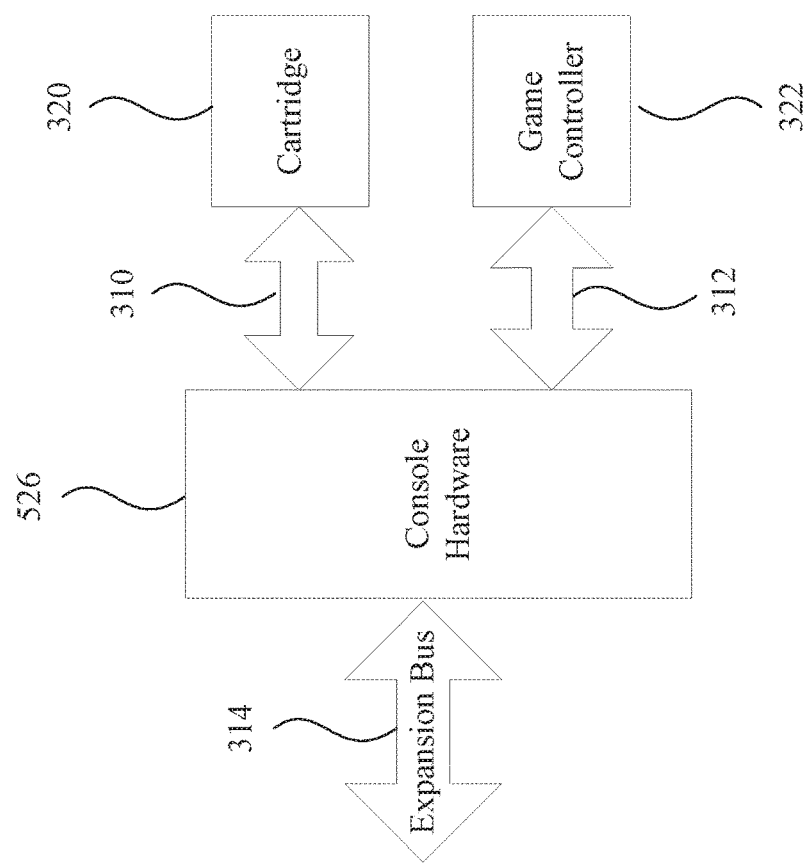
FIG. 5 illustrates a third exemplary expansion console configuration according to examples of the disclosure.

FIG. 5 illustrates an exemplary block diagram of an example expansion console 500 (which can correspond to one of expansion consoles 106A-106C) configuration according to examples of the disclosure. In the example shown, example expansion console 500 includes console hardware 526. Console hardware 526 may incorporate aspects of the hardware of a target gaming console associated with example expansion console 500. In some examples, console hardware 526 may comprise a duplicate of original hardware used in the target gaming console. In some examples, console hardware 526 may comprise original hardware in addition to hardware not used in the target gaming console (e.g., modern computing hardware designed to simulate the behavior of the original hardware). In some examples, console hardware 526 may comprise modern computing hardware (e.g., modern computing hardware designed to simulate the behavior of the original hardware). Console hardware 526 can convey an advantage of allowing emulation that very closely resembles the behavior of the target gaming console, for example by replicating highly hardware-specific behaviors of the target console that may be difficult or impossible to emulate via software.

In some examples, the bus 314 (which can correspond to the bus 214 above) can be coupled to console hardware 526. In some examples, console hardware 526 can connect to a game cartridge 320 and game controller 322 without additional signal conditioning hardware. In some examples, console hardware 526 can comprise hardware that is not directly compatible with cartridge 320 and/or game controller 322 (e.g., hardware having different logic levels than game cartridge 320 and/or game controller 322), and an optional signal conditioning block (e.g., 318 above) can optionally be added between the console hardware and the cartridge 320 and/or game controller 322 to promote compatibility. In some examples, the console hardware 526 can produce video frame and audio data for communication over the expansion bus 314 (similar to expansion console 300 above). In some examples, console hardware 526 may comprise original console hardware to provide the video and audio data using a well-known protocol (e.g., VGA). However, in some examples, a signal conditioning block, which may include one or more digital-to-analog converters (DACs) (not shown), can be added between the console hardware 526 and the expansion bus 314 to protect sensitive hardware of the base unit 102. Thus, in some examples, example expansion console 500 can provide video frames and audio data over the expansion bus 314 to the base unit 102, instead of or in addition to providing game data and controller data.

Figure 6:
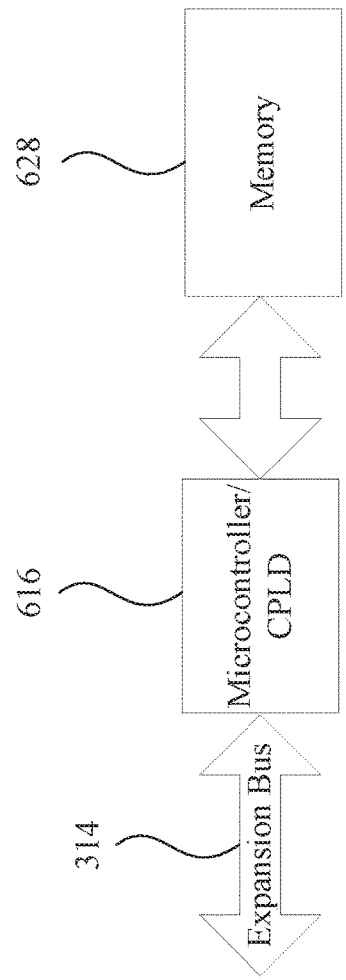
FIG. 6 illustrates a fourth exemplary expansion console configuration according to examples of the disclosure.

FIG. 6 illustrates an exemplary block diagram of an example expansion console 600 (which can correspond to one of expansion consoles 106A-106C) configuration according to examples of the disclosure. In some examples, the expansion bus 314 (which can correspond to expansion bus 214 above) can couple base unit 102 to microcontroller 616 (which can correspond to microcontroller 316 above). In some examples, the microcontroller 616 can be coupled to memory 628 (e.g., flash memory, SD, MMC, etc.) that can include game data (e.g., as a ROM file or ISO file). The microcontroller 616 can read the game data from memory 628 and communicate the data over expansion bus 314 to the base unit 102. Thus, in the configuration of FIG. 6, the example expansion console 600 can provide game data over the bus 314 to the base unit 102.

In another example configuration of expansion console 600, the microcontroller 616 can be replaced by an FPGA (e.g., FPGA 424 above), and emulation can also be performed on the expansion console 600, with the expansion console 600 providing video frames and audio data to the bus 314 as described above with respect to expansion console 400. In another example configuration, the functionality of expansion consoles 300 and 600 could be combined into a single expansion console capable of reading directly from a cartridge (e.g., 220) and a game controller (e.g., 222), as well as reading game data from a memory (e.g., 628). In such a configuration, active cartridge reading, as described below, could also be performed directly from a cartridge (e.g., 220) while supplementary data is read from memory (e.g., 628 above).

Figure 7:
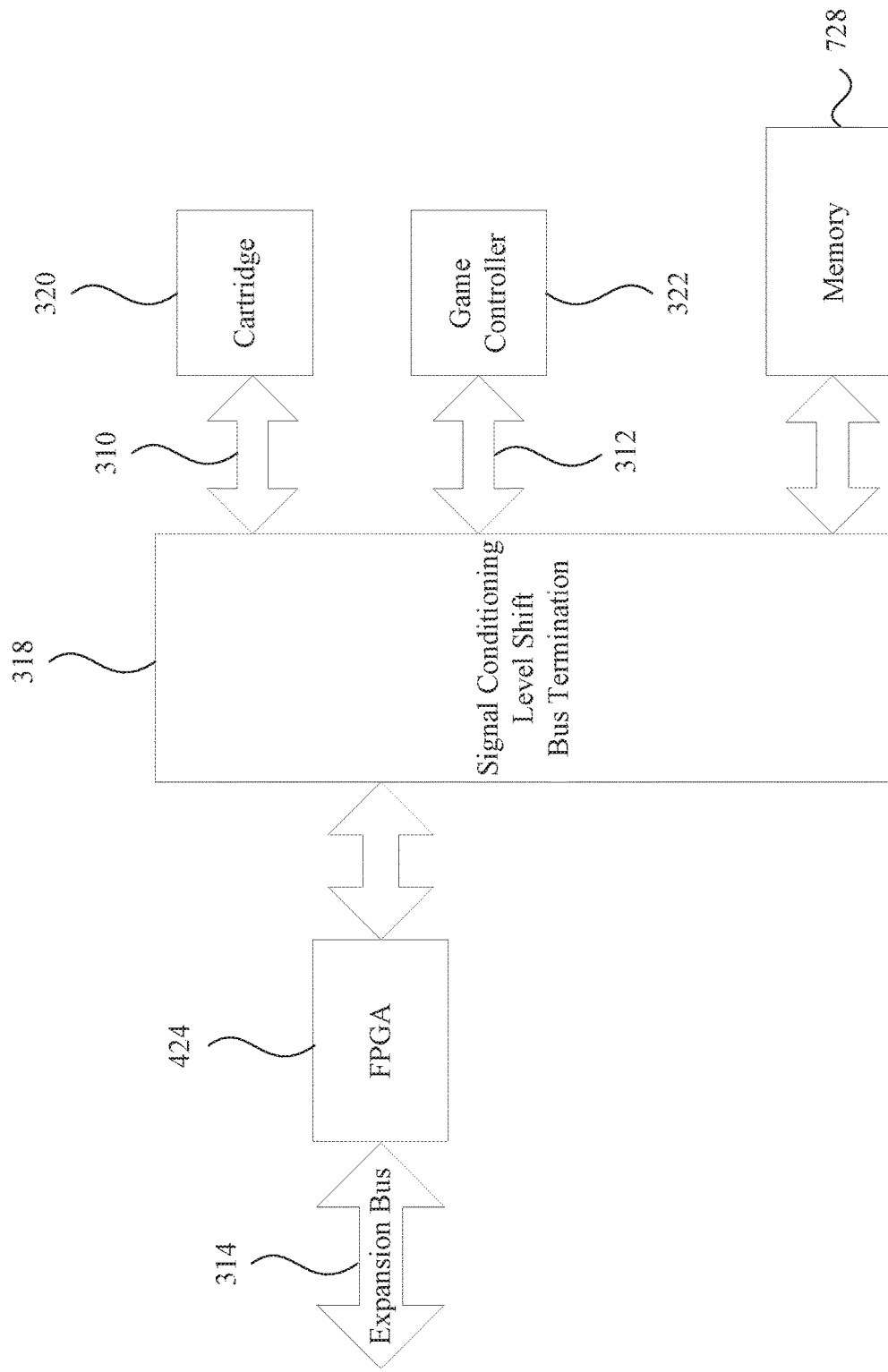
FIG. 7 illustrates a fifth exemplary expansion console configuration according to examples of the disclosure.

FIG. 7 illustrates an exemplary block diagram of an example expansion console 700 (which can correspond to one of expansion consoles 106A-106C) configuration according to examples of the disclosure. Example expansion console 700 can include all of the components described above with respect to expansion console 400. Further, in some examples, expansion console 700 can include a separate memory 728 that can include game data. In some examples, memory 728 can supplement game cartridge 220, which may employ active cartridge reading as described below. In some examples, memory 728 may comprise game data corresponding to one or more target games. Further, in some examples, that game data can be included with the expansion console (e.g., as a bonus item for purchasing the expansion console). Similarly, in some examples, memory 728 for game data could be included any expansion console, such as expansion consoles 300-600 described above. In some examples, an expansion console may include hardware (e.g., one or more level shifters, microcontrollers, CPLDs, and/or FPGAs) to allow console hardware (e.g., 526) to access game data on memory 728.

In some examples, an expansion console, such as the example expansion consoles described above with respect to FIGS. 3-7, may include a memory (e.g., memory 728 in FIG. 7) and/or a connector for a cartridge (e.g., cartridge 320 in FIGS. 3-5 and FIG. 7), but may not include a controller interface (e.g., controller interface 312 in FIGS. 3-5 and FIG. 7). Additionally, such examples may include a controller interface, but may not have a game controller (e.g., game controller 322 in FIGS. 3-5 and FIG. 7) connected to the controller interface. In these examples, the memory or the cartridge can provide game code and/or data, with controller input provided by a controller external to the expansion console—for example, a controller connected to the base unit (e.g., controller 216 connected to base unit 202 in FIG. 2). These examples may be advantageous for reducing the physical size and/or manufacturing cost of the expansion console, by omitting a controller or a controller interface; or in situations where a desired form factor of modular video game system 200 would make it impractical or impossible to have a controller connected to the expansion console.

In some examples, an expansion console, such as the example expansion consoles described above with respect to FIGS. 3-7, may include a controller interface (e.g., controller interface 312 in FIGS. 3-5 and FIG. 7), but may not include a memory (e.g., memory 728 in FIG. 7) or a connector for a cartridge (e.g., cartridge 320 in FIGS. 3-5 and FIG. 7). In these examples, a controller connected to the controller interface can provide input signals, while game code and/or data can be provided by a source external to the expansion console—for example, a memory connected to the base unit (e.g., a hard drive connected via a USB interface to base unit 202 in FIG. 2). These examples may be advantageous for reducing the physical size and/or manufacturing cost of the expansion console, by omitting a memory or a cartridge interface; for reducing the power requirements of the expansion console; or in situations where a desired form factor of modular video game system 200 would make it impractical or impossible to have a memory or a game cartridge connected to the expansion console.

Bus Configuration

Figure 8:
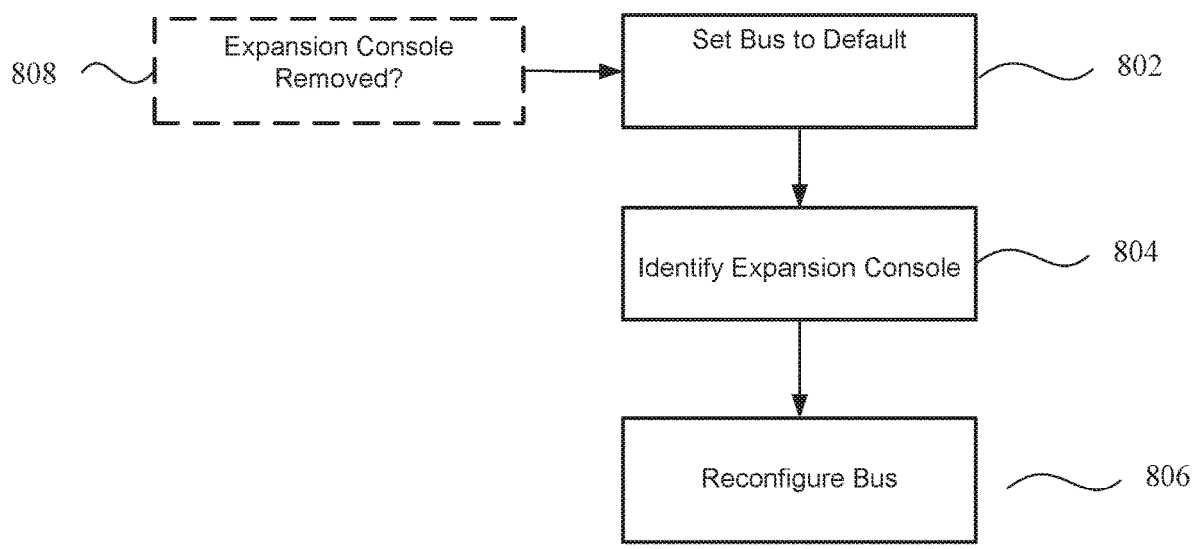
FIG. 8 illustrates an exemplary bus configuration sequence according to examples of the disclosure.

FIG. 8 illustrates an exemplary configuration sequence 800 of the modular video game system 200 according to examples of the disclosure. In some examples, upon startup of the base unit 102, a configuration sequence 800 can be initiated. Configuration sequence 800 can include steps for configuring bus 214, for example by configuring a communication protocol associated with bus 214. In some examples, bus 214 may be software configurable, such that software (e.g., platform software executing on the base unit) can set a configuration of the bus 214. In some examples, bus 214 may be hardware configurable, such that a bus controller can set a configuration of the bus 214.

In an example bus configuration, a first group of bus connections may be assigned to behave as general purpose inputs to the base unit 102, and a second group of connections may be assigned to behave as general purpose outputs of the base unit 102. In an example bus configuration, a first group of the bus connections can be assigned as general purpose inputs, a second group of the bus connections can be assigned as general purpose outputs, and a third group of the bus connections can be assigned as interrupts and/or control lines. In some examples, a subset of the bus connections can remain dedicated to communication between the base unit 102 and expansion consoles (e.g., 300-700 above) using a fixed protocol (e.g., I2C, SPI, etc.) In accordance with some bus configurations, bus 214 may also change its read/write behavior either exclusively based on or in addition to software controlled data registers. In some examples, a first group of data registers can be assigned as general purpose write registers, a second group of data registers can be assigned as general purpose read registers, and a third group of data registers can be designated for miscellaneous data.

In some examples, at step 802, base unit 102 can set a communication protocol associated with bus 214 into a default configuration, for example using a default data protocol that be used to communicate between the base unit 102 and expansion consoles (e.g., 300-700 above). In some examples, at step 804 of the configuration sequence, while the bus is in a default configuration, the base unit 102 can set a configuration of bus 214 in accordance with a target gaming console associated with an expansion console (e.g., any of expansion consoles 300-700 above). For example, base unit 102 may communicate with the expansion console to identify a target gaming console (e.g., NES, Sega Genesis, TurboGrafx16) of the expansion console, and set a configuration of bus 214 associated with that target gaming console. In some examples, if no expansion console is connected to the base unit 102, the configuration sequence 800 can remain at step 804 (in some examples, in a default configuration) until an expansion console (e.g., 300-700 above) is connected. Once the gaming console association of a connected expansion console (e.g., 300-700 above) is detected, at step 806 the base unit 102 can optionally reconfigure the bus 214 to a bus configuration associated with the target console. In some examples, at step 808, if it is detected that the expansion console (e.g., 300-700 above) has been disconnected from the base unit 102, the configuration sequence 800 can return to step 802, setting the bus (e.g., 214 above) into the default configuration, and allowing the base unit to communicate with a new expansion console that becomes connected. In other words, the configuration sequence 800 allows for hot-swapping of two or more expansion consoles, where a first expansion console requires a first bus configuration, and a second expansion console requires a second bus configuration different from the first configuration.

In some examples, modular video game system 200 can be compatible with two or more expansion consoles that send and receive significantly different data. For instance, as described above, expansion consoles 300 and 600 can provide the base unit 102 with game data and game controller data; however, the game data and game controller data may adhere to various formats and protocols that may be incompatible. Configuration of bus 214, for example during step 806 as described above, can improve the compatibility of modular video game system with many types of expansion consoles and associated target game consoles. For instance, in examples where low latency is desirable for getting the game cartridge data and game controller data to the base unit emulator, bus 214 may be configured in step 806 according to a reduced-bandwidth bus configuration that promotes low latency. Conversely, in some examples, an expansion console (e.g., expansion consoles 400 and 500) can provide the base unit 102 with only video frames and audio output data, instead of or in addition to raw game cartridge data. Here, a higher latency and higher bandwidth interface (e.g., SDIO, USB, etc.) may be desirable in order to ensure consistent handling of such data between the expansion console and the base unit 102 (e.g., outputting audio/video signal to a display). In such examples, bus 214 could be configured at step 806 to correspond to a higher latency and higher bandwidth interface.

Active Cartridge Reading

In some examples, modular video game system 200 emulating a target gaming console may employ active cartridge reading to better simulate the experience of running a game on the target gaming console. Active cartridge reading is a process that involves reading data directly and on demand, similar to how a target gaming console might read data from a physical game cartridge. Conventional emulators differ from their target gaming consoles by reading cartridge data not from a cartridge, but instead from a memory that includes game data (e.g., a ROM file) corresponding to a game cartridge. This practice may compromise the authenticity of the emulation, by relying on emulator software to accurately reproduce the behavior of the target gaming console—no matter how idiosyncratic—that may result from reading data from a game cartridge. Active cartridge reading can improve on conventional emulators by accessing data directly from the cartridge, rather than from a computer file corresponding to that cartridge. In some examples, data is accessed at the moment the emulator requires it, which is typically during a prefetch for the next emulated instruction to be executed. In some examples, data from the cartridge only stays resident in memory long enough to be processed, and is subsequently replaced when the next request for data has been fulfilled.

Active cartridge reading can also allow the emulator to request data on demand from specialized hardware, such as custom memory controllers and microcontrollers. This process relaxes the requirement that an emulator authentically reproduce, in software, the outputs of the specialized hardware; instead, the emulator can access data directly from the hardware itself. Active cartridge reading thus allows for a level of authenticity that is difficult or impossible to achieve using conventional emulation methods. In addition, active cartridge reading simplifies the process of emulating game data on game cartridges that may exhibit unusual logical layouts and memory techniques, such as bank switching and unorthodox memory mappings. Conventional emulators thus face a problem of where to find ROM data, and must accommodate game cartridge memory techniques via software—using techniques that may be unreliable and difficult to implement, such as custom memory mappers. In contrast, active cartridge reading removes the need for such accommodation by dynamically requesting data from a cartridge. Even specialized game cartridges featuring nonstandard data organizations including obscure game cartridges, cartridges that are yet to be released, and cartridges developed by the gaming community—are easily accommodated without low-level analysis or reverse engineering, and without complex and costly modification of emulator software.

Emulator Selection

Figure 9:
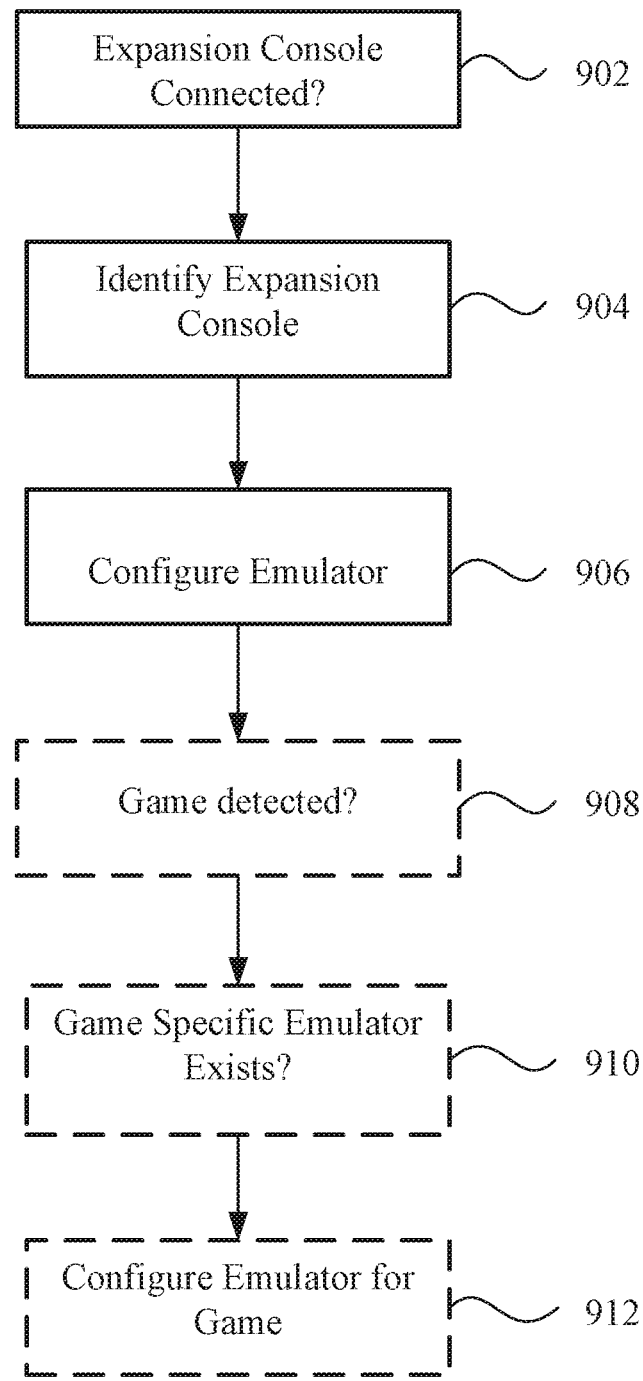
FIG. 9 illustrates an exemplary emulator selection sequence according to examples of the disclosure.

FIG. 9 illustrates an exemplary emulator selection sequence 900 according to examples of the disclosure. In some examples, modular video game system 200 can support emulation of numerous target games and target game consoles. Typically, each such target game or target game console presents unique challenges and technical requirements. Moreover, different target games and target game consoles operate on different hardware, including different processors that employ different instruction sets. There is thus no one-size-fits-all emulator that can provide emulation for every target game console, or even for every game on a single target game console. It may thus be desirable to select, on a per-game or per-game console basis, an emulator best suited to that particular game or game console.

Example selection sequence 900 illustrates, with respect to modular video game system 200, selecting a target emulator for a target game or target game console. In some examples, at step 902, the selection sequence 900 can determine if an expansion console (e.g., any of expansion consoles 300-700 above) is connected to the base unit 102. If an expansion console is detected, at step 904 the selection sequence 900 can identify one or more target game consoles associated with the detected expansion console. In some examples, at step 906, the selection sequence 900 can configure a target emulator for use by the base unit 102 based on the one or more target game consoles. In some examples, a console identifier for the one or more target game consoles can be used as an index to a registry comprising one or more emulators, to select a target emulator from the register. In some examples the emulator registry can be stored in memory (e.g., flash memory) on the base unit, retrieved from a remote location (e.g., a server on the internet), or both. In some examples, a target emulator may be identified and/or configured based only on the one or more target game consoles associated with an expansion console.

In some examples, as described above, a specific game for a gaming console may be associated with a different emulator than other games for the same console. For example, certain game cartridges may include auxiliary hardware components that are not present in most game cartridges for the same associated console. These games may benefit from special handling by an emulator. In some examples, an emulator (which may be the same as or different from the emulator selected at step 906 above) may be associated with a specific game. In some examples, configuration parameters for the emulator can be set based on a detected game, and can cause the emulator to operate differently for the specific game than other games on the same associated console. At step 908, the example selection sequence 900 can determine which game is associated with specific game data (e.g., by identifying a game on a game cartridge, identifying which game among multiple games on a flash memory has been selected for emulation, etc.). The game data can be associated with a game cartridge, a flash memory, an optical disc, or other suitable media. In some examples, no specific identifying information is included in the game data itself (e.g., for game data for gaming consoles that would not support any such information).

In some examples, a game specific hash can be used to identify a target emulator from an emulator registry. For example, if game data on a cartridge is detected at the expansion console 300, the expansion console 300 can compute a hash using data in the cartridge (or in other memory on the expansion console) and communicate the hash to the base unit 102 via the bus 214. In some examples, base unit 102 may compute the hash directly. In some examples, the emulator registry can include a hash table with an entry for every available game (i.e., a game library) on a particular gaming console. In some examples, the emulator registry can include a default emulator associated with a particular gaming console, and a list of games that are exceptions to the default emulator. If a game is not listed in the list of exceptions, then a default emulator can be selected for use with that game. In some examples, a computed hash can be a unique identifier for each game. In some examples, at step 910, the selection sequence 900 can determine whether a game-specific emulator, or game-specific emulation settings, exist for corresponding game data. If a game specific emulator or game specific emulation settings exists, at step 912 the selection sequence 900 can change the emulation configuration (e.g., on the expansion console or the base unit) to use the game-specific emulator or the game-specific emulation settings. If at step 910, the selection sequence 900 determines that no game-specific emulator or game-specific emulation settings exist, the emulator identified in step 906 can be used.

In some examples, emulator configuration at step 906 can be skipped, and an emulator only selected when a game is detected and a hash value corresponding to the game is computed. In such examples, at step 912, the selection sequence 900 can configure the emulation configuration to use a suitable emulator for the detected game.

Therefore, according to the above, some examples of the disclosure are directed to a method of configuring a bus comprising configuring the bus in a first configuration of inputs and outputs, detecting a presence of a removable module on the bus, receiving an input on the bus indicative of a module type of the removable module, in accordance with a determination that the module type of the removable module is a first module type associated with a first video game console, configuring the bus in a second configuration of inputs and outputs, and in accordance with a determination that the module type of the removable module is a second module type associated with a second video game console, different from the first video game console, configuring the bus in a third configuration of inputs and outputs, different from the first and second configurations of inputs and outputs. Additionally or alternatively to one or more of the examples disclosed above, in some examples, the first module type outputs video data to the bus and the second module type outputs game data to the bus. Additionally or alternatively to one or more of the examples disclosed above, in some examples, the method further comprises, in accordance with the determination that the module type of the removable module is the first module type, selecting an emulator associated with the first video game console. Additionally or alternatively to one or more of the examples disclosed above, in some examples, the method further comprises, in accordance with the determination that the module type of the removable module is the second module type, selecting an emulator associated with the second video game console, different from the emulator associated with the first video game console. Additionally or alternatively to one or more of the examples disclosed above, in some examples, the method further comprises, while the bus is configured in the second configuration, detecting whether the removable module is removed from the bus, and in accordance with a determination that the removable module is removed from the bus, configuring the bus in the first configuration. Additionally or alternatively to one or more of the examples disclosed above, in some examples, the first configuration is different from the second configuration.

Some examples of the disclosure are directed to a gaming console comprising, a base unit, a bus coupled to the base unit and capable of coupling to a removable module, a bus controller, and platform software configured to: configure the bus in a first configuration of inputs and outputs, detect a presence of the removable module on the bus, receiving an input on the bus indicative of a module type of the removable module, in accordance with a determination that the module type of the removable module is a first module type associated with a first video game console, configure the bus in a second configuration of inputs and outputs, different from the first configuration, and in accordance with a determination that the module type of the removable module is a second module type associated with a second video game console, different from the first video game console, configure the bus in a third configuration of inputs and outputs, different from the first and second configurations of inputs and outputs. Additionally or alternatively to one or more of the examples disclosed above, in some examples, the first module type outputs video data to the bus and the second module type outputs game data to the bus. Additionally or alternatively to one or more of the examples disclosed above, in some examples, the platform software is further configured to: in accordance with the determination that the module type of the removable module is the first module type, select an emulator associated with the first video game console. Additionally or alternatively to one or more of the examples disclosed above, in some examples, the platform software is further configured to: in accordance with the determination that the module type of the removable module is the second module type, selecting an emulator associated with the second video game console, different from the emulator associated with the first video game console. Additionally or alternatively to one or more of the examples disclosed above, in some examples, the bus controller is further configured to: while the bus is configured in the second configuration, detect whether the removable module is removed from the bus, and in accordance with a determination that the removable module is removed from the bus, configure the bus in the first configuration. Additionally or alternatively to one or more of the examples disclosed above, in some examples, the first configuration is different from the second configuration. Additionally or alternatively to one or more of the examples disclosed above, in some examples, the removable module further includes a memory for storing game data. Additionally or alternatively to one or more of the examples disclosed above, in some examples, the gaming console comprises a handheld gaming console. Additionally or alternatively to one or more of the examples disclosed above, in some examples, the gaming console comprises one or more of a display, a speaker, an input controller, and a battery.

Some examples of the disclosure are directed to a method of configuring a modular gaming console comprising: initiating the gaming console in a first configuration, determining whether a first removable module connected to the gaming console corresponds to a first video game console, and in accordance with a determination that the removable module corresponds to the first video game console, initializing a first emulator corresponding to the first video game console. Additionally or alternatively to one or more of the examples disclosed above, in some examples, the method further comprises: detecting removal of the first removable module, detecting connection of a second removable module, different from the first removable module, determining whether the second removable module connected to the gaming console corresponds to a second video game console, and in accordance with a determination that the removable module corresponds to the second video game console, initializing a second emulator, different from the first emulator, corresponding to the second video game console. Additionally or alternatively to one or more of the examples disclosed above, in some examples, the method further comprises: detecting insertion of a game cartridge into the first removable module corresponding to the first video game console, determining whether the game cartridge is associated with a cartridge specific emulator, different from the first emulator, and in accordance with a determination that the game cartridge is associated with the cartridge specific emulator, initializing the cartridge specific emulator, different from the first emulator.

Some examples of the disclosure are directed to a method of configuring a modular gaming console comprising: initiating the gaming console in a first configuration, determining whether first game data corresponds to a first video game and a first video game console, in accordance with a determination that the first game data corresponds to the first video game and the first video game console, initializing a first emulator, determining whether second game data corresponds to a second video game and the first video game console, and in accordance with a determination that the second game data corresponds to the second video game and the first video game console, initializing a second emulator, different from the first emulator. Additionally or alternatively to one or more of the examples disclosed above, in some examples, the first and second emulators belong to a plurality of emulators associated with the first video game console. Additionally or alternatively to one or more of the examples disclosed above, in some examples, the method further comprises: determining whether third game data corresponds to a third video game and a second video game console, and in accordance with a determination that the third game data corresponds to the third video game and the second video game console, initializing a third emulator associated with the second video game console.

Some examples of the disclosure are directed to a gaming console comprising: a base unit coupled to a socket for accepting a gaming cartridge, the gaming cartridge comprising a computer-readable medium containing instructions executable by a first processor, the base unit comprising a second processor configured to emulate, with an emulator, a console for running a game corresponding to the instructions, the console corresponding to the gaming cartridge; and a cartridge reading controller configured to read data from the gaming cartridge, wherein running the game from the gaming cartridge comprises: requesting, by the emulator, first data from the gaming cartridge; in response to the request, reading, by the cartridge reading controller, the first data from the gaming cartridge and second data from the legacy gaming cartridge, the second data based on the request; and providing, by the cartridge reading controller to the emulator, the first data for running the game. Additionally or alternatively to one or more of the examples disclosed above, in some examples, the gaming cartridge further comprises one or more of a clock, a battery, a storage, a memory, a memory controller, and a processor. Additionally or alternatively to one or more of the examples disclosed above, in some examples, the first processor corresponds to a first type, and the second processor corresponds to a second type different from the first type. Additionally or alternatively to one or more of the examples disclosed above, in some examples, the first processor corresponds to a first instruction set, the second processor corresponds to a second instruction set different from the first instruction set, and the instructions correspond to the first instruction set.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A method of configuring a bus comprising:
configuring the bus in a first configuration of inputs and outputs;
detecting a presence of a removable module on the bus;
receiving an input on the bus indicative of a module type of the removable module;
in accordance with a determination that the module type of the removable module is a first module type associated with a first video game console, configuring the bus in a second configuration of inputs and outputs; and
in accordance with a determination that the module type of the removable module is a second module type associated with a second video game console, different from the first video game console, configuring the bus in a third configuration of inputs and outputs, different from the first and second configurations of inputs and outputs, wherein the first module type outputs video data to the bus and the second module type outputs game data to the bus.

2. The method of claim 1, further comprising: in accordance with the determination that the module type of the removable module is the first module type, selecting an emulator associated with the first video game console.

3. The method of claim 2, further comprising:
in accordance with the determination that the module type of the removable module is the second module type, selecting an emulator associated with the second video game console, different from the emulator associated with the first video game console.

4. The method of claim 1, further comprising:
while the configuration bus is configured in the second configuration, detecting whether the removable module is removed from the bus, and in accordance with a determination that the removable module is removed from the bus, configuring the bus in the first configuration.

5. The method of claim 1, wherein the first configuration is different from the second configuration.

6. A gaming console comprising:
a base unit;
a bus coupled to the base unit and capable of coupling to a removable module;
a bus controller;
and platform software configured to:
configure the bus in a first configuration of inputs and outputs;
detect a presence of the removable module on the bus;
receive an input on the bus indicative of a module type of the removable module;
in accordance with a determination that the module type of the removable module is a first module type associated with a first video game console, configure the bus in a second configuration of inputs and outputs, different from the first configuration; and
in accordance with a determination that the module type of the removable module is a second module type associated with a second video game console, different from the first video game console, configure the bus in a third configuration of inputs and outputs, different from the first and second configurations of inputs and outputs, wherein the first module type outputs video data to the bus and the second module type outputs game data to the bus.

7. The gaming console of claim 6, the platform software further configured to:
in accordance with the determination that the module type of the removable module is the first module type, select an emulator associated with the first video game console.

8. The gaming console of claim 7, the platform software further configured to:
in accordance with the determination that the module type of the removable module is the second module type, select an emulator associated with the second video game console, different from the emulator associated with the first video game console.

9. The gaming console of claim 6, the bus controller further configured to:
while the bus is configured in the second configuration, detect whether the removable module is removed from the bus, and in accordance with a determination that the removable module is removed from the bus, configure the bus in the first configuration.

10. The gaming console of claim 6, wherein the first configuration is different from the second configuration.

11. The gaming console of claim 6, wherein the removable module further includes a memory for storing game data.

12. The gaming console of claim 6, wherein the gaming console comprises a handheld gaming console.

13. The gaming console of claim 12, wherein the gaming console further comprises a display, a speaker, an input controller, or a battery.

* * * * *